United States Patent [15] 3,636,259
Karras [45] Jan. 18, 1972

[54] ANSWERING TIME RECORDER FOR TELEPHONE APPARATUS

[72] Inventor: Ernest C. Karras, 1643 N. Natoma, Chicago, Ill. 60635

[22] Filed: Feb. 26, 1970

[21] Appl. No.: 14,563

Related U.S. Application Data

[63] Continuation of Ser. No. 810,600, Mar. 26, 1969.

[52] U.S. Cl. ....................................179/8 A, 179/6, 179/7.1
[51] Int. Cl. ....................................H04m 3/36
[58] Field of Search ....................................179/8.6, 7.1

[56] References Cited

UNITED STATES PATENTS 2,393,403 1/1946 Ostline ....................................179/8
2,708,691 5/1955 Molnar ....................................179/8
2,876,282 3/1959 Callaway ....................................179/8

*Primary Examiner*—Kathleen H. Claffy
*Assistant Examiner*—Jan S. Black
*Attorney*—Mason, Kolehmainen, Rathburn & Wyss

[57] ABSTRACT

A separate, independently controlled electronic timer is provided for each trunk in a trunk group to be monitored. Each timer develops an output pulse if an incoming call in the associated trunk is not answered within a predetermined answering interval. The output pulses of all of the timers are combined and supplied to a solenoid-operated counter which stores and indicates the total number of calls which are not answered within the predetermined interval. The pulses supplied to the counter may also be supplied to a set of print wheels under the control of a printout interval timer so that a permanent record in numerical form is made of the number of calls which exceed the predetermined answering interval during each printout interval. Lockout facilities are also provided for preventing the transmission of output pulses to the print wheels during the actual printing operation. Also, facilities are provided for terminating the printout interval only at a time when no output pulses are being transmitted to the print wheels.

18 Claims, 10 Drawing Figures

INVENTOR:
ERNEST C. KARRAS

By Mason, Kolehmainen Rathburn & Wyss
Attorneys

INVENTOR:
ERNEST C. KARRAS
By Mason, Kolehmainen
Rathburn & Wyss
Attorneys

PATENTED JAN 18 1972

3,636,259

INVENTOR:
ERNEST C. KARRAS
By Mason, Kolehmainen, Rathburn & Wyss
Attorneys

INVENTOR:
ERNEST C. KARRAS

By Mason, Kolehmainen, Rathburn, & Wyss
Attorneys

INVENTOR:
ERNEST C. KARRAS
By Mason, Kolehmainen Rathburn & Wyss
Attorneys

INVENTOR:
ERNEST C. KARRAS
By Mason, Kolehmainen
Rathburn & Wyss
Attorneys

ANSWERING TIME RECORDER FOR TELEPHONE APPARATUS

The present invention is a continuation-in-part of my copending application Ser. No. 810,600 filed Mar. 26, 1969.

The present invention relates to recorder apparatus for use in connection with telephone systems, and, more particularly, to recorder apparatus which may be used to record the time required by switchboard operators to answer incoming calls when said answering time exceeds a predetermined amount.

One of the factors in determining the quality or grade of telephone service is the speed with which a call is answered by operator-handled calls. Various arrangements have been heretofore proposed for determining the length of time the subscriber waits to get the services of an operator. In general, these arrangements have been expressed in terms of the number of times a subscriber has had to wait more than a predetermined time interval to get the services of the operator. However, these excessive answering time recorders have not found widespread acceptance due to the fact that they do not provide an accurate measure of the number of times an operator fails to answer a call within a predetermined time interval.

This is because of the fact that the answering time recorder apparatus heretofore proposed has employed only a single timing means for use with a predetermined group of trunks or lines. Usually one answering time recorder unit is assigned to a fairly large group of trunks, for example, 25 trunks and the first incoming call on any one of these trunks is assigned to the answering time recorder. The total number of calls initiated on all the trunks during the period while the timing means is being used is also recorded, and a weighted system is employed to interpolate and provide a rough indication of the number of times the operator exceeds a predetermined answering period. However, such an arrangement is clearly based on an interpolation process and is not an accurate measure of the number of times the operator actually exceeds the predetermined answering period on each trunk in the entire group of trunks.

It is also desirable, in many instance, to provide a printed record, in numerical form, of the number of times the operator exceeds a predetermined answering period during successive monitoring or printout intervals, together with the time at which each printout occurs. Such an arrangement permits an analysis of the service which the operator is giving on a time interval basis and also provides a permanent record which can be preserved and used later for toll rate studies, and the like.

It is, therefore, one object of the present invention to provide a new and improved answering time recorder which may be employed with a group of trunks and accurately records the total number of times the operator fails to answer a call within a predetermined time interval.

It is another object of the present invention to provide a new and improved answering time recorder where individual electronic timers are associated with each line or trunk in a predetermined group of trunks and individually measure the time required to answer the particular call incoming thereto, the total number of excessive answering times being recorded on a common indicating means.

It is a still further object of the present invention to provide a new and improved answering time recorder which is capable of simultaneously observing and timing up to 25 trunks in a group and of providing substantially instantaneous indications of the total number of times a predetermined answering period is exceeded by the operator.

It is another object of the present invention to provide a new and improved answering time recorder which provides an exact count of the total number of times a predetermined answering period is exceeded within a group of trunks and also provides an exact peg count of the total number of calls incoming to said group of trunks.

It is a further object of the present invention to provide a new and improved answering time recorder wherein the exact number of times a predetermined answering period is exceeded by the operator in conjunction with a predetermined group of trunks is recorded and facilities are provided for changing the predetermined answering period.

It is a still further object of the present invention to provide a new and improved answering time recorder wherein individual timing means are employed with each trunk in a group, each of said individual timing means being provided with its own timing base so that the time required to answer a call is independently measure in each timing means.

It is another object of the present invention to provide a new and improved answering time recorder wherein individual units which are arranged to accurately measure a predetermined group of trunks may be multiplied together to accommodate larger trunk groups with a minimum of interconnections while providing an accurate measure of the total number of times a predetermined answering period is exceeded in the entire group of trunks.

It is a further object of the invention to provide a new and improved answering time recorder wherein a permanent record in numerical form is made of the number of times an operator exceeds a predetermined answering period in each of successive printout intervals.

It is a still further object of the present invention to provide a new and improved answering time recorder system wherein the total number of times an operator exceeds a predetermined answering period is stored and indicated over a relatively long time interval and during said interval successive printed records are made during successive relatively short printout intervals.

It is another object of the invention to provide a new and improved answering time recorder system in which facilities are provided for operation in conjunction with the E and M signalling leads of a given telephone system.

Briefly, in accordance with the present invention, a separate and independently actuated timer is permanently associated with each trunk of a large group of trunks and is arranged to provide an output pulse in the event the call associated therewith is not answered within a predetermined time interval. The output pulses from all of the timers associated with the trunks in the group are electronically combined and immediately supplied to a digitized indicating means such as a solenoid-operated counter, or the like. Facilities are provided for combining the output pulses from other groups of trunks so that all output pulses may be displayed on a common indicating means. In addition, an accurate count of the total number of calls incoming to the group of trunks is supplied to a peg counter arrangement, the peg counter circuit being also arranged to function with additional groups of trunks.

The invention, both as to its organization and method of operation, together with further objects and advantages thereof, will best be understood by reference to the following specification taken in connection with the accompanying drawings in which.

Figure 1:
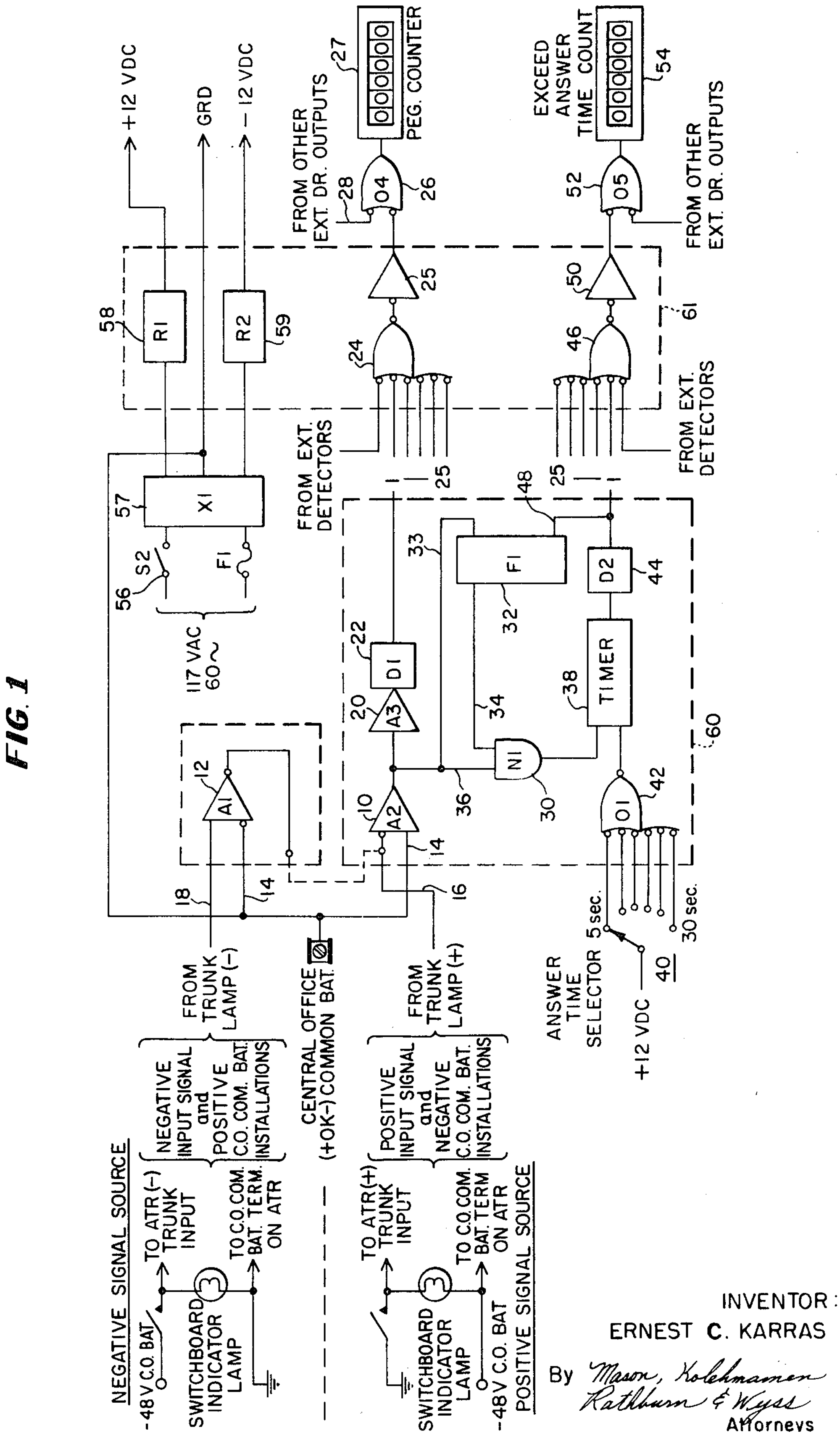
FIG. 1 is a logic diagram of the circuitry of the answering time recorder apparatus of the present invention.
Figure 2:
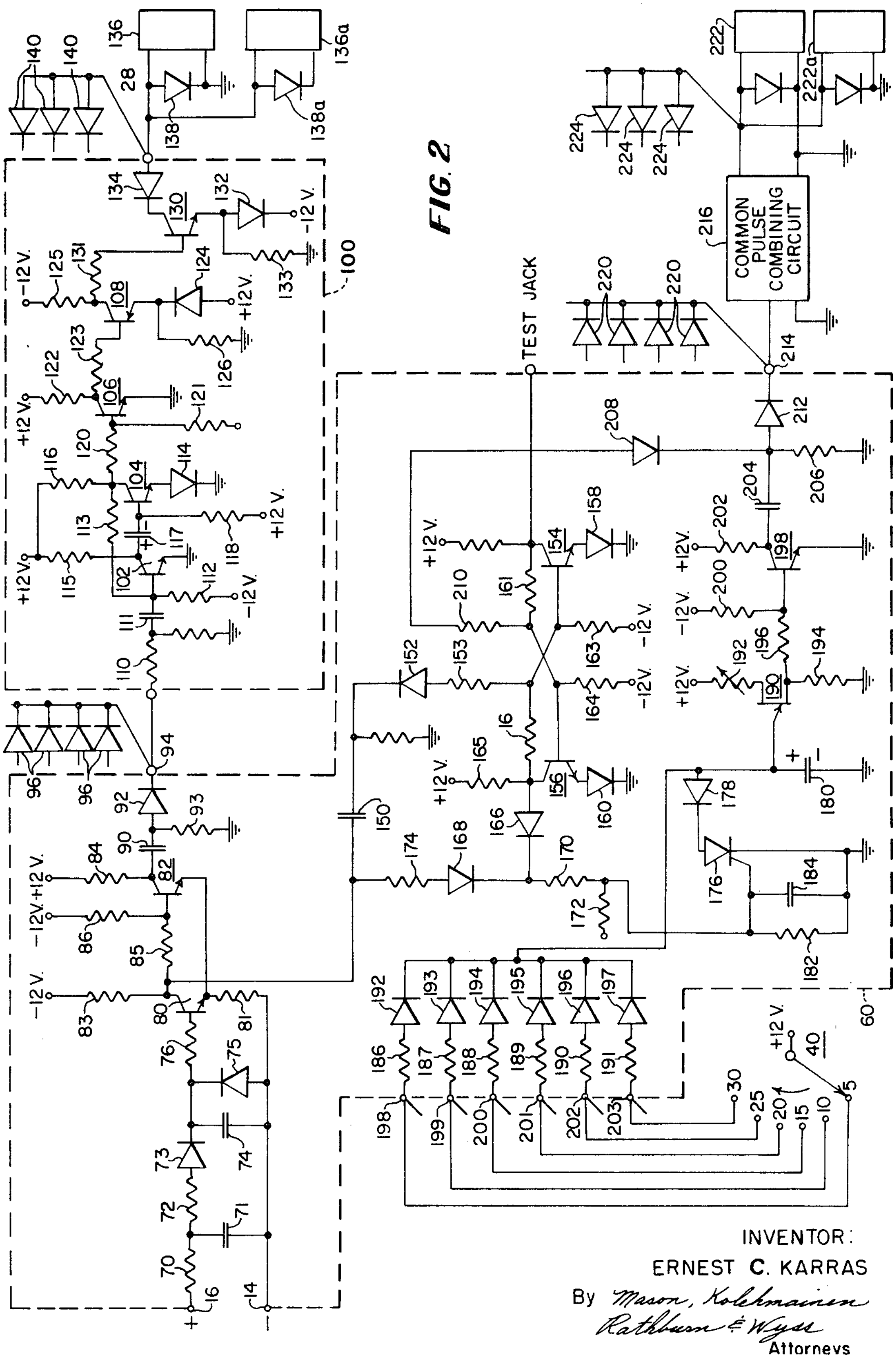
FIG. 2 is a detailed schematic diagram of the apparatus of FIG. 1.
Figure 3:
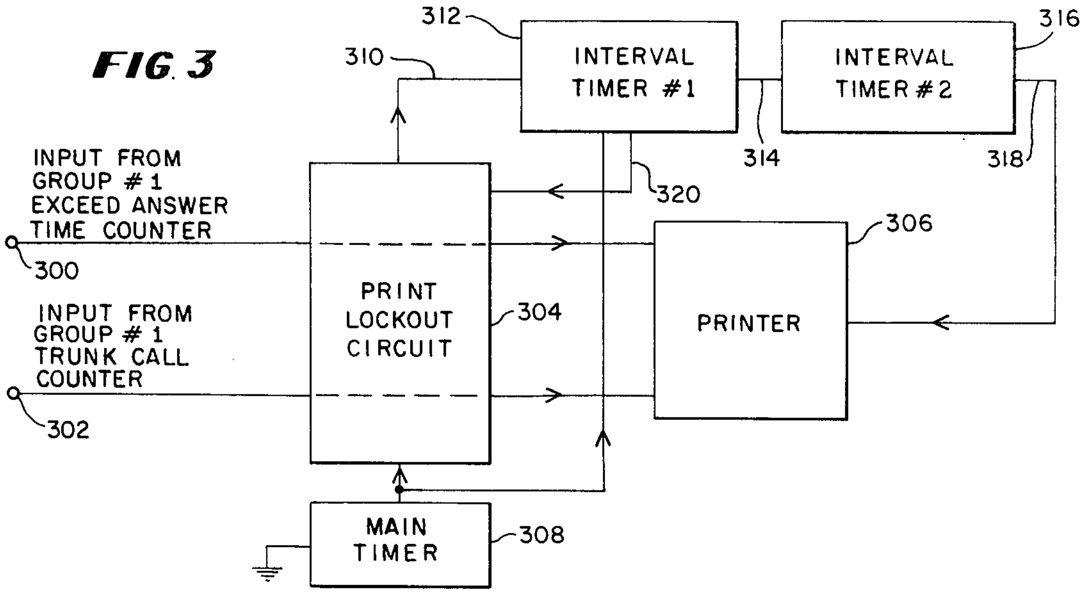
FIG. 3 is a block diagram of an answering time recorder system printout facility embodying feature of the present invention.
Figure 6:
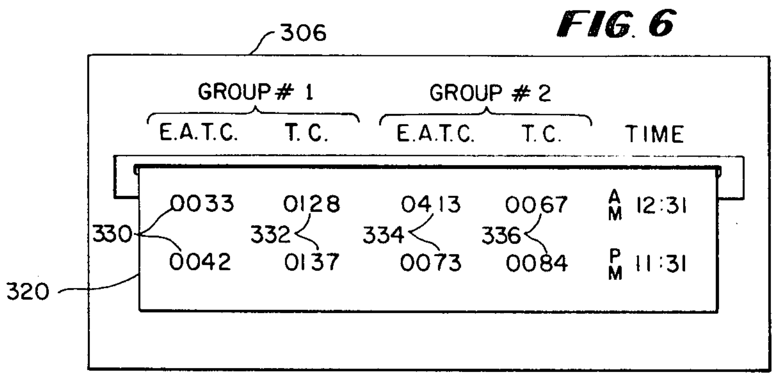
Figure 7:
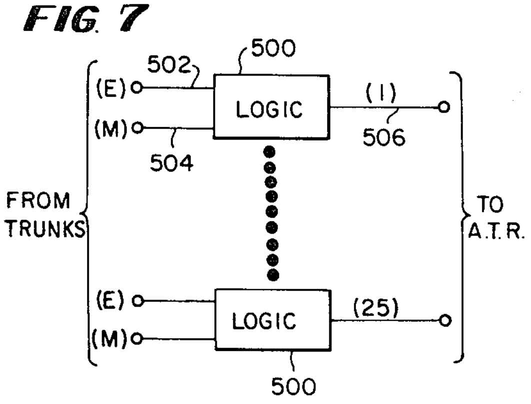
Figure 8:
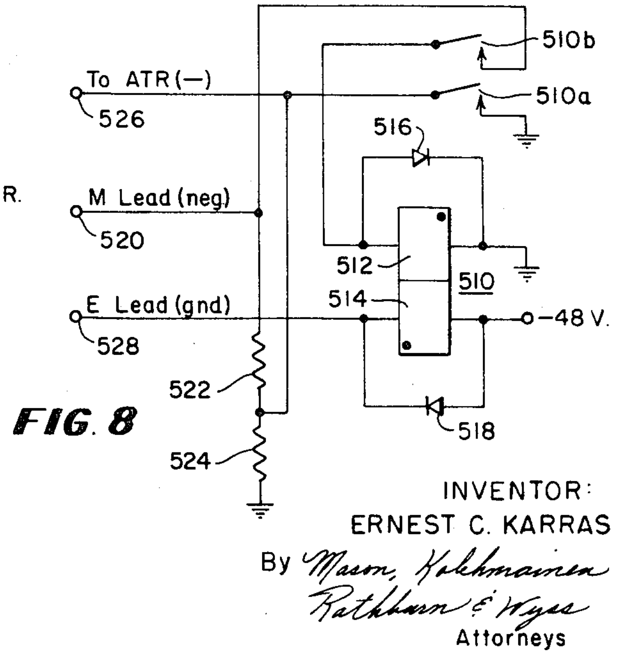
Figures 4A, 4C:
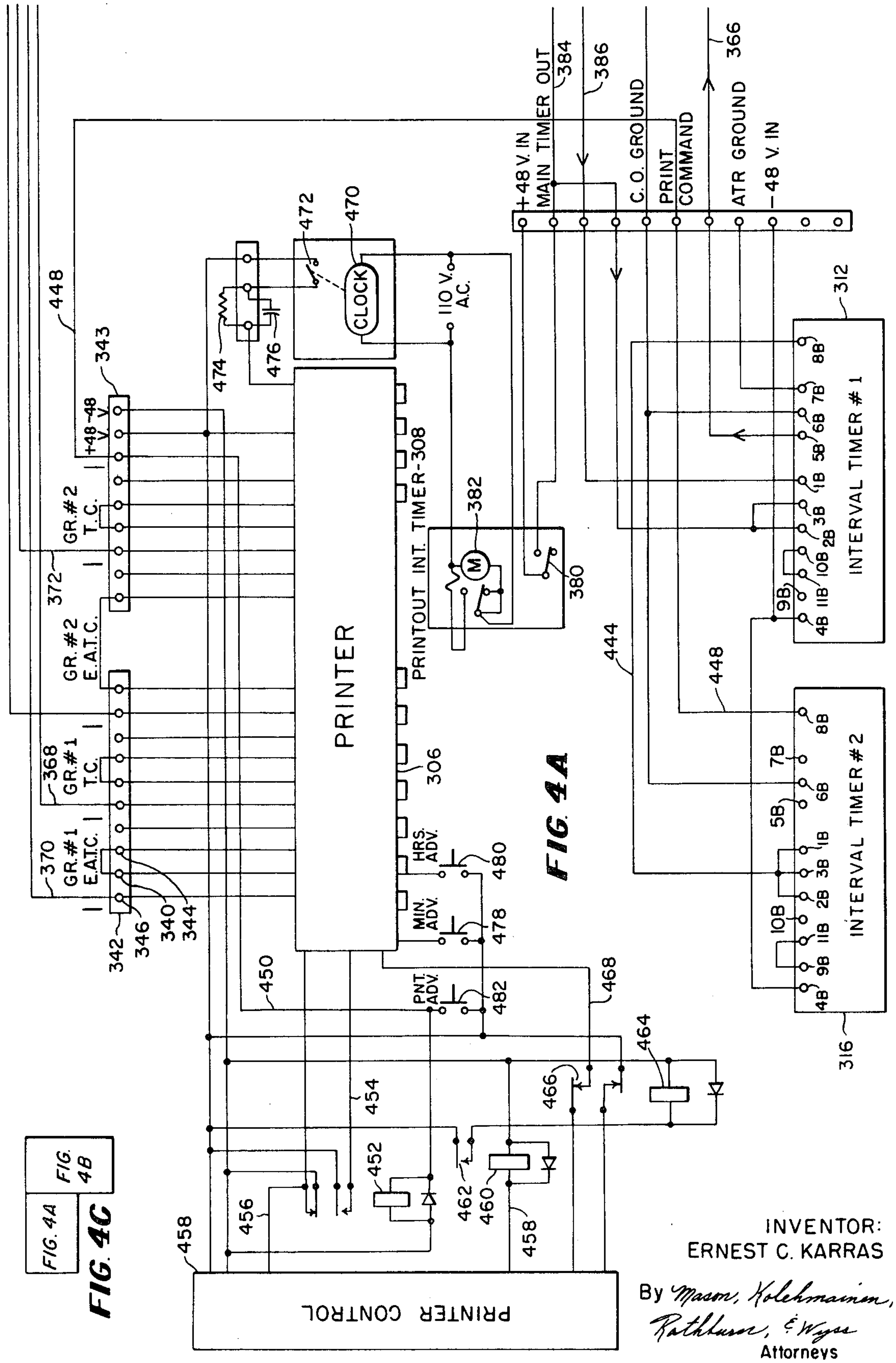
Figure 4B:
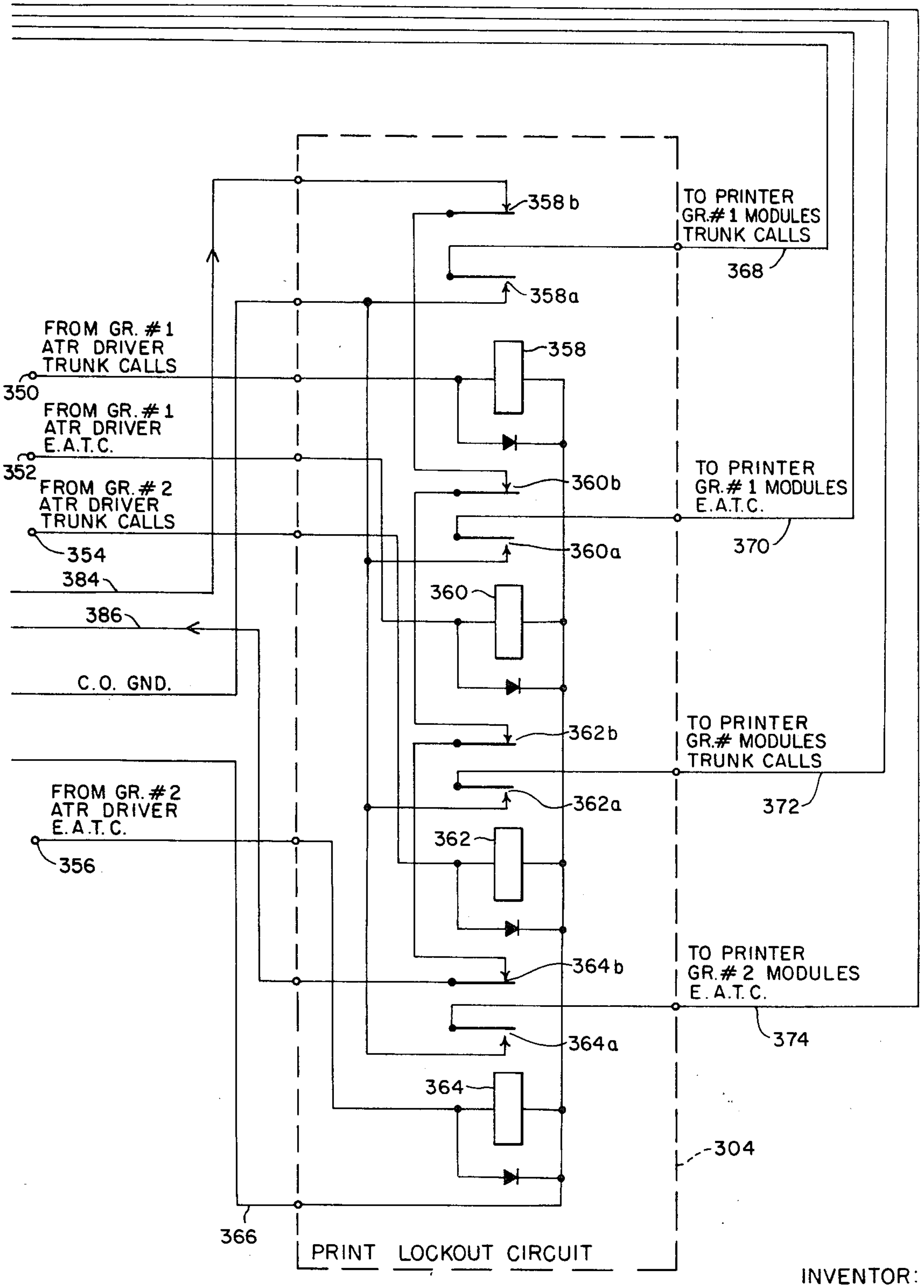
Figure 5:
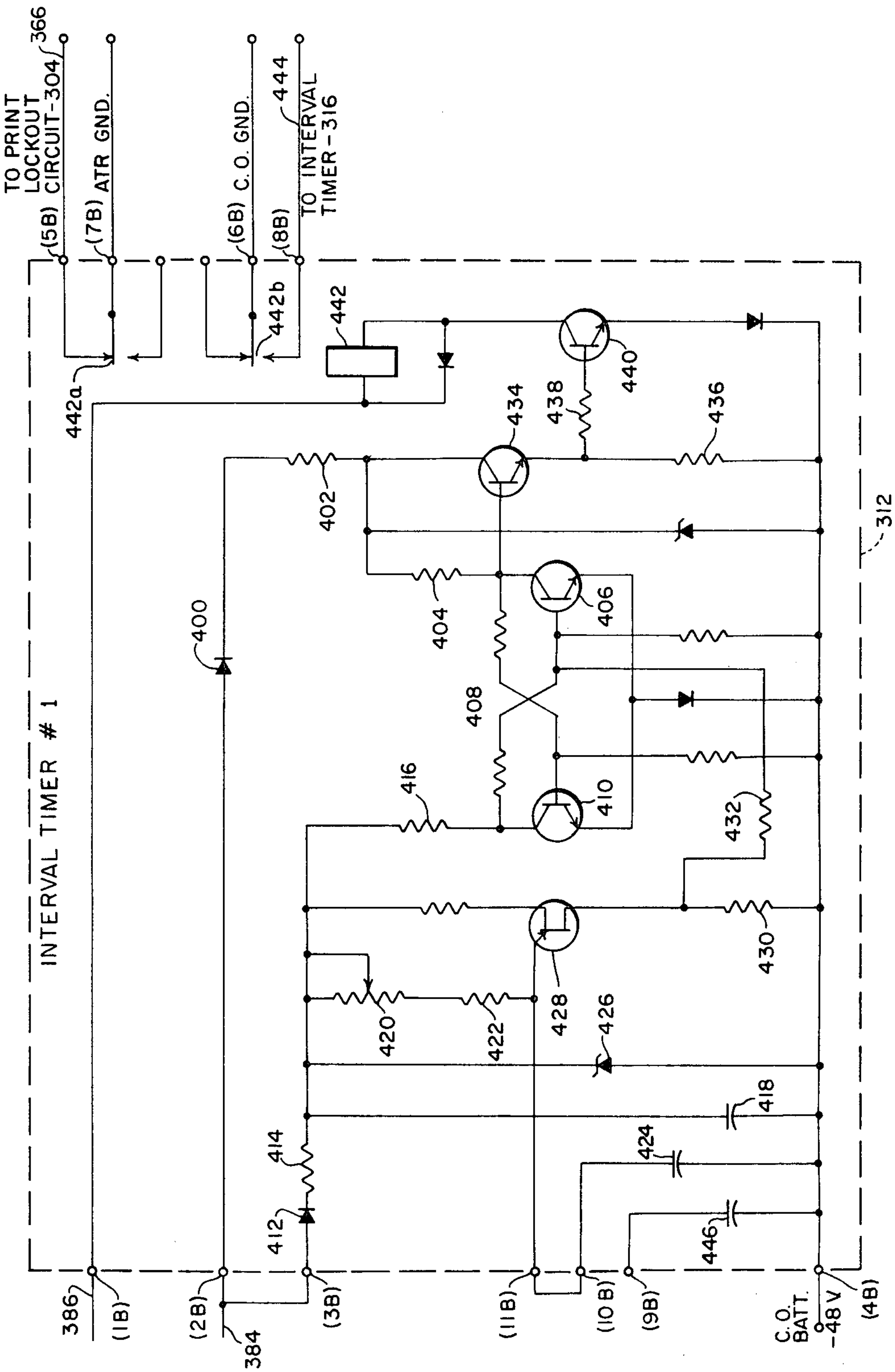

FIGS. 4A and 4B, when arranged in the manner shown in FIG. 4C, comprise a more complete schematic diagram, partly in block diagram form, of the printout arrangement of FIG. 3;

FIG. 5 is a schematic diagram of one of the interval timers of FIG. 4A;

FIG. 6 is a front view of the panel arrangement for a typical printout system such as shown in FIG. 3;

FIG. 7 is a block diagram of an E and M lead adapter arrangement which may be used with the answering time recorder system of FIGS. 1 and 2; and FIG. 8 is a schematic diagram of one of the logic circuits used in the adapter system of FIG. 7, Referring now to the drawings, and more particularly to FIG. 1 thereof, receipt of a call at the switchboard position causes the associated lamp to be illuminated. Depending upon the polarity of the indicator lamp voltage, a signal is applied either to an amplifier 10, or to an inverter 12 the output of which is connected to the amplifier 10. More particularly, one input 14 of the amplifier 10 is connected to the Central Office battery terminal and if a signal which is positive with respect to battery is derived from the trunk lamp, this signal is supplied over a conductor 16 to the other input of the amplifier 10. If the signal from the trunk lamp is negative, it is applied by way of the conductor 18 to the input of the inverter 12, the other input of this inverter being connected to the common battery terminal 14. The output of the inverter 12 is then connected to the input 16 of the amplifier 10, as indicated in dotted lines in FIG. 1.

The output of the amplifier 10 is supplied to an amplifier 20 the output of which is connected to a differentiation circuit 22 so as to provide a positive signal in response to an incoming call to the switchboard on the indicated trunk. The differentiation network 22 develops a positive output pulse which is supplied to an OR-gate 24 along with the output pulses from 24 other trunks in the 25 trunk group being monitored. The output of the OR-gate 24 is supplied through an amplifier 25 and an OR-gate 26 to a peg counter 27 so that the counter 27 indicates the total number of calls incoming to the group of 25 trunks being monitored. In addition, the OR-gate 26 is provided with a number of other inputs indicated generally at 28, which may be derived from other 25 trunk groups. The OR-gate 26 may have up to 10 inputs so that as many as 250 trunks may be simultaneously monitored on the peg counter 27.

When an incoming signal is passed through the amplifier 10 it is also supplied to an AND-gate 30 the other input of which is controlled from a flip-flop 32. When a call is initiated the flip-flop 32 is set by means of a signal supplied over the conductor 33 so as to enable one input 34 of the AND-gate 30 and when a signal is developed in the output of the amplifier 10 it is supplied to the other input 36 so as to enable an electronic timer 38 at the start of a call. The timer 38 is controlled by means of an answer time selector switch indicated generally at 40 which is common to the group of 25 trunks, the output of which is supplied to an OR-gate 42 which in turn controls the particular answering time interval after which the timer 38 develops an output pulse. If the call is not answered by the switchboard operator within the time period set by the selector switch 40, the timer 38 develops an output pulse which is supplied to a differentiation network 44 the output of which is supplied to an OR-gate 46 having inputs from the other 24 trunks in the 25 trunk group. The output of the differentiation network 44 is also supplied by way of the reset conductor 48 to the flip-flop 32 so that the flip-flop 32 is reset and inhibits the AND-gate 30. Inhibiting of the AND-gate 30 disables the timer 38 until another call is received. The output of the OR-gate 46 is also supplied to an amplifier 50 which in turn drives an OR-gate 52 the output of which is supplied to an exceed-answer-time counter 54 so that the counter 54 provides an accurate indication of the total number of calls in the 25 trunk group which have not been answered by the operator within the selected answering time interval.

In the event that the call is answered by the operator within the predetermined time interval, the voltage to the indicator lamp disappears and the signal in the output of the amplifier 10 likewise disappears so that the AND-gate 30 is disabled and disables the timer 38 so that it does not develop an output pulse.

The portion of the above-described circuitry individual to each trunk is energized from a common power supply unit. More particularly, 60-cycle AC power is supplied through a switch 56 to a transformer and bridge rectifier combination 57 the output of which is supplied through a voltage regulator 58 to the plus 12 volt DC output and through a voltage regulator 59 to the minus 12 volt DC output. The common terminals between the regulators 58 and 59 is ground. The circuitry within the dotted rectangle 60 in FIG. 1 is individual to each trunk of the 25 trunk group and the circuitry within the dotted line 61 is individual to each 25 trunk group.

Referring now to FIG. 2, while the voltage supplied to the indicator lamp on the operator switchboard is essentially a DC signal, due to such factors as cabling between trunks, high-frequency noise and contact bounce, there is a considerable amount of undesired frequency components and hash on the input terminals 14, 16. Accordingly, a first filter comprising a series resistor 70 and a shunt capacitor 71 of relatively small value, are employed to eliminate high-frequency noise components. A second series resistor 72, a series diode 73, a shunt capacitor 74 of relatively large value and a shunt diode 75 are then provided to remove other undesired frequency components from the input conductors 14, 16, these undesired components including the inductive kicks induced by cabling from other circuits, double pulses due to contact bounce, and the like. The diode 75 also prevents any voltage from being developed across the filter capacitor 74 in the reverse direction.

The output of the above-described filter is coupled through a resistor 76 to the base of a transistor 80 the emitter of which is connected to ground through a resistor 81. A second transistor 82 has its emitter connected to resistor 81 so as to provide a form of Schmidt trigger circuit. The collector of the transistor 80 is connected to plus 12 volts through a resistor 83 and the collector of the transistor 82 is connected to the plus 12-volt terminal through a resistor 84. The output of the transistor 80 is directly coupled through a resistor 85 to the base of the transistor 82, this base also being connected to minus 12 volts through a resistor 86.

The transistors 80 and 82 correspond to the amplifiers 10 and 20 in FIG. 1 but are interconnected through the common emitter circuit to provide the necessary feedback so that a positive input signal at the terminal 16 results in the full conduction of the transistor 80 while at the same time the transistor 82 is rendered fully nonconductive. Accordingly, a negative signal is developed at the collector of the transistor 80 in response to an incoming call while at the same time a positive signal is developed at the collector of the transistor 82 in response to this incoming call. This positive signal is coupled through a capacitor 90 and an OR-gate diode 92 to a common output terminal 94, the junction of the capacitor 90 and the diode 92 being connected to ground through a resistor 93. Each time a call comes into the trunk connected to the terminals 14, 16, a positive pulse of approximately 1-millisecond duration is developed across the resistor 93 and is supplied through the OR-gate rectifier 92 to the common output terminal 94.

In a similar manner, calls incoming to any one of the other 24 trunks of the 25 trunk group being monitored are supplied through the respective OR gate rectifiers associated therewith, indicated generally at 96, to the common output terminal 94. All of these positive output pulses, which represent the initiation of calls on the 25 trunk group, are supplied to a common pulse combining circuit indicated generally at 100 in FIG. 2, the circuit 100 corresponding to the amplifier 25 referred to generally heretofore in connection with FIG. 1. More particularly, the pulse-combining circuit 100 includes a monostable multivibrator comprising transistors 102 and 104, which convert the incoming 1-millisecond pulses into relatively wide pulses of sufficient duration to give the associated counter time to register each incoming pulse so that an accurate peg count of the number of calls incoming to the 25 trunk group is displayed on the counter 27. The circuit 100 also includes transistors 106 and 108 which are operated as a direct-coupled amplifier and amplify the output pulses from the monostable multivibrator to a sufficient power level to actuate the counter 27.

Referring to the specific circuitry of the circuit 100, all of the peg count pulses from the 25 trunk group are supplied through a resistor 110 and a coupling capacitor 111 to the base of the transistor 102, this base being connected to minus 12 volts through a resistor 112 and being cross coupled through a resistor 113 to the collector of the transistor 104. The emitter of the transistor 102 is directly connected to ground and the emitter of the transistor 104 is connected through a protective diode 114 to ground. The collector of the transistor 102 is connected to plus 12 volts through a resistor 115 and the collector of the transistor 104 connected to plus 12 volts through a resistor 116. The collector of the transistor 102 is connected through a time constant circuit comprising the series capacitor 117 to the base of the transistor 104, this base being connected through the resistor 118 to plus 12 volts. The time constant of the capacitor 117 and resistor 118 is so chosen that in response to each positive 1-millisecond pulse developed at the terminal 94, a relatively wide pulse of sufficient duration to permit storage and registration of each pulse in the counter 27 is developed at the collector of the transistor 104. For example, the counters 27 and 54 may be of the type comprising a plurality of interconnected discs, one for each digit, which bear readout numerals on the periphery thereof and are driven by a common solenoid-operated pawl and ratchet arrangement. Such an arrangement both stores the number of peg count pulses and provides an instantaneous indication of the stored number. However, such a mechanically actuated counter requires an operating time of approximately 15 to 20 milliseconds between input pulses. Accordingly, the width of the output pulse developed in the collector circuit of the transistor 104 may be made equal to 15 to 20 milliseconds for cooperation with the above-described mechanically actuated counter. However, it will be understood that other types of counters, such as electronic counters, may be employed for storage and indication purposes in which case the time required for registration of each pulse is considerably less and, in such instances, the width of the monostable pulse which is developed in the output of the transistor 104 may be correspondingly narrower. However, the mechanically actuated counter is preferred in the illustrated answering time recorder because it is inexpensive, of relatively small dimensions and weight and relatively fast acting to provide accurate registration of the total number of pulses.

In the circuit 100, the transistor 106 is normally held nonconductive by means of the bias network including a resistor 120 connected between the collector of the transistor 104 and the base of the transistor 106, and a resistor 121 connected from the base of the transistor 106 and minus 12 volts. When the positive monostable pulse is developed in the collector circuit of the transistor 104, the transistor 106 is rendered fully conductive so that a corresponding negative pulse is developed across the collector resistor 122 and is supplied through a resistor 123 to the base of the transistor 108. The emitter of the transistor 108 is connected through a bias diode 124 to plus 12 volts and the collector of this transistor is connected through a resistor 125 to minus 12 volts. The emitter of the transistor 108 is also connected through a resistor 126 to ground so that the emitter of the transistor 108 is operated normally at approximately plus 11 volts. Since the base of the transistor 108 is normally operated at plus 12 volts, the transistor 108 is normally fully conductive. However, when the amplified pulse developed by the transistor 106 is supplied to the base of the transistor 108, this transistor is rendered fully nonconductive so that a large amplitude pulse is developed across the collector resistor 125.

A driver stage comprising a transistor 130 is provided, the base of the transistor 130 being connected to the collector of the transistor 108 through a resistor 131. The transistor 130 is normally biased nonconductive by means of the diode 132 and resistor 133. However, when a large amplitude pulse is developed in the collector circuit of the transistor 108, the transistor 103 is rendered fully conductive and current is supplied through an OR-gate diode 134 to the solenoid coil 136 of the peg counter 27, the other side of this solenoid being connected to ground. A pulse suppression diode 138 is connected across the solenoid 136 and suppresses inductive kicks which might be of sufficient amplitude to damage the transistor 130.

A number of additional pulse-combining circuits, such as the circuit 100, which are associated with other 25 trunk groups, may also be supplied to the peg counter solenoid coil 136, the OR gate diodes of these pulse-combining circuits being indicated as the diodes 140 which are connected to the coil 136 over the conductor 28. If desired another peg count solenoid **136*a* may be connected in parallel with the coil 136 to provide a peg count at a remote station, this coil having a protective diode 138*a*** connected across it.

Considering now the circuitry of the electronic timing means provided for each trunk in the 25 trunk group, it will be recalled that when a call is initiated on the trunk associated with the terminals 14, 16, a negative going signal is produced at the collector of the transistor 80. This negative signal is coupled through a capacitor 150, a diode 152 and a resistor 153 to the transistor of a traNsistor 154. The transistor 154 together with a second transistor 156 forms a conventional flip-flop circuit. The emitters of the transistors 154 and 156 are connected through protective diodes 158 and 160, respectively, to ground, the collectors of these two transistors are connected to the base of the opposite transistor through the resistors 161 and 162 and the bases of these transistors are connected to minus 12 volts through the resistors 163 and 164, respectively.

If the preceding call on the associated trunk was not answered within the predetermined answering period, the flip-flop 154, 156 will be in its reset condition and the above-described negative pulse supplied to the base of the transistor 154 will cause the transistor 154 to be turned off and the transistor 156 to be turned on. When the transistor 156 is thus rendered conductive, the flow of current through the collector load resistor 165 thereof reduces the voltage applied to the anode of an AND-gate diode 166 and renders this diode conductive. The cathode of the diode 166 is connected to the cathode of a second AND-gate diode 168, the junction of the two diodes 166 and 168 being connected through resistors 170 and 172 to minus 12 volts. The anode of the AND-gate diode 168 is connected through a resistor 174 to the collector of the transistor 80 and when an incoming call is initiated the flow of current through the collector resistor 83 reduces the voltage applied to the anode of the diode 168. Accordingly, when the flip-flop 154, 156 has been triggered to its set position by the incoming call, the voltage at the junction of the resistors 170, 172 is reduced from a value of approximately plus 3 volts with respect to ground to a value of approximately minus 0.5 volts.

The potential at the junction of the resistors 170, 172 is applied to the control electrode of a silicon-controlled rectifier 176 the cathode of which is connected to ground, and the anode of which is connected through a compensating diode 178 to a large timing capacitor 180 the other end of which is connected to ground. A time delay network comprising a shunt resistor 182 and a capacitor 184 is connected between the control electrode of the controlled rectifier 176 and ground and serves a purpose to be described in more detail hereinafter. Charging current for the timing capacitor 180 is derived from the plus 12-volts supply through the answering time interval selector switch 40, one of a number of dropping resistors 186 to 191, inclusive, and one of a number of isolating diodes 192 to 197, inclusive. For example, when the selector switch 40 is in the 5-second interval setting the 12-volt supply is connected by way of the resistor 186 and the isolating diode 192 to the timing capacitor 180. The selector switch 40 may act as a common answering time interval selector for the timers associated with a group of trunks, the circuitry 60 of the additional trunks in this group being connected to the indicated multiple points 198 to 203, inclusive.

In accordance with an important feature of the invention, during periods when a call is not being timed, a low-amplitude high-frequency sawtooth oscillation is produced across the timing capacitor 180 so that charging of this capacitor during the timing interval does not start from zero volts but starts from a voltage dependent upon the firing potentials of the series-connected diode 178 and the silicon-controlled rectifier 176. More particularly, the capacitor 180 is charged from the 12-volt supply through a selected one of the resistors 186 to 191, inclusive, so that the voltage across the capacitor 180 builds up until the silicon-controlled rectifier 176 is rendered conductive. When this occurs, the capacitor 180 is discharged through the diode 178 and the controlled rectifier 176 until the holding current of the control rectifier 176 is too low for this rectifier to remain conductive at which point the capacitor 180 starts to charge again. As a result of this action, a high-frequency sawtooth oscillation of approximately 0.25-volt peak amplitude is continuously developed across the capacitor 180 during periods when a call is not being timed. This means that timing of the call starts from a point at which the capacitor 180 is charged to approximately 2 volts rather than starting from a point at which the capacitor has zero voltage across it. Such an arrangement eliminates the deleterious resistance and inductive effects which occur when timing is started from zero charge on the capacitor 180. Furthermore, the inclusion of the series diode 178 increases the potential at which the sawtooth oscillation is produced and hence avoids the lower portion of the charging curve of the capacitor 180 which is nonlinear and which changes with temperature. In this connection it will be understood that the amplitude of the sawtooth oscillation must be of relatively small magnitude so as not to interfere with the accuracy of timing of the answering period.

When the associated trunk is seized and the AND-gates 166 and 168 are both enabled the potential applied to the control electrode of the silicon-controlled rectifier 176 is reduced from plus 3 volts to minus 0.5 volt. When this occurs, the silicon-controlled rectifier will be rendered nonconductive by the above-described operation of the sawtooth oscillations produced across the capacitor 180 and due to the reduced voltage applied to the control electrode of the rectifier 176, this rectifier will remain nonconductive thus allowing the voltage across the capacitor 180 to increase.

A unijunction transistor 190 is provided to measure the timing period, the emitter of the unijunction transistor 190 being connected to the capacitor 180, one base of the transistor 190 being connected through a potentiometer 192 to plus 12 volts and the other base thereof being connected through a small resistor 194 to ground. The potentiometer 192 is adjusted so that the unijunction transistor is not rendered conductive at the voltage level of the above-described sawtooth oscillations developed across the capacitor 180. However, when the voltage across the capacitor 180 rises to a relatively large value, such as 8 volts, the unijunction transistor 190 is rendered conductive and immediately starts to discharge the capacitor 180 through the resistor 194. This produces a positive voltage pulse across the resistor 194 which pulse is supplied through a resistor 196 to the base of a transistor 198. The transistor 198 is normally held nonconductive by current flow through the resistor 200 connected between the base thereof and the minus 12-volt supply. However, when the capacitor 180 starts to discharge and a positive voltage pulse is produced across the resistor 194, the transistor 198 is turned on and a negative pulse is developed across the collector resistor 202 thereof. This negative pulse is coupled through a coupling capacitor 204 to an output resistor 206 and is also supplied through a reset diode 208 and a resistor 210 to the baSe of the transistor 156 in the flip-flop 154, 156, so that this flip-flop is reset. When the flip-flop 154, 156 is reset, the transistor 156 is rendered nonconductive so that the AND-gate diode 166 is no longer enabled and the potential at the junction of the resistors 170, 172 increases to plus 3 volts.

If the control rectifier 176 were immediately rendered conductive in response to the development of plus 3 volts at this junction, the coupling capacitor 204, to which a negative pulse is applied when the unijunction transistor 190 is rendered conductive, would not have a chance to discharge appreciably so that only a negative pulse would be developed across the output resistor 206. However, the output from the timing means 60, i.e., the pulse across resistor 206, is coupled through an OR-gate diode 212 to the common output terminal 214 and is supplied to a common pulse-combining circuit 216. The circuit 216 is similar to the circuit 100 and is arranged to accept positive input pulses in a manner similar to that described in detail heretofore in connection with the circuit 100.

In accordance with a further feature of the present invention, the above-described time delay network comprising the resistor 182 and the capacitor 184 is provided in the control electrode circuit of the control rectifier 176 so that a delay of approximately 5 milliseconds is produced between the time the flip-flop 154, 156 is reset and the time at which the silicon-controlled rectifier 176 is fired in response to disabling of the AND-gate diode 166. This 5-millisecond interval gives the capacitor 204 sufficient time to discharge through the resistor 206 and the emitter-collector path of transistor 198 so that when the control rectifier 176 is rendered conductive and the capacitor 180 is abruptly further discharged to the sawtooth oscillation level through the rectifier 176 and diode 178, the resultant potential increase at the collector of the transistor 198, when this transistor is again rendered nonconductive, is transmitted through the capacitor 204 and the AND-gate diode 212 as a positive pulse and is supplied to the circuit 216 for combination with other output pulses produced by timing means 60 associated with other trunks in the 25 trunk group. The OR gate diodes associated with these other timers are indicated collectively as the diodes 220.

If the incoming call is answered within the predetermined answering interval, the flip-flop 154, 156 remains in its set position in which the transistor 156 is conducting and the AND-gate diode 166 is enabled. However, answering of this call causes the negative potential at the collector of the transistor 80 to disappear so that the diode 168 is disabled and the potential at the junction of the resistors 170 and 172 becomes plus 3 volts. The rectifier 176 is turned on after the delay provided by the network 182, 184 and discharges the capacitor 80. The next incoming call finds the diode 166 already enabled and as soon as the diode 168 is also enabled by the new incoming call, the potential at the junction of the resistors 170, 172 falls to minus 0.5 volt and a new timing cycle is initiated as described heretofore.

The circuit 216 may be identical to the circuit 100 and converts the relatively sharp positive-going pulses applied to the common terminal 214 into relatively wide pulses by means of a monostable multivibrator circuit similar to the circuit 102, 104 in the circuit 100, as described in detail heretofore. These relatively wide output pulses from all of the timers in the 25 trunk group are amplified and raised to a suitable power lever to actuate the solenoid 222 of the answering time counter 54 so that an exact count of the number of times that the predetermined answering period is exceeded in connection with calls originating on any one of the trunks in the 25 trunk group is continuously displayed on the counter 54. In addition, as indicated above in connection with the peg count counter 27, a number of other output pulses from different 25 trunk groups may be multipled to the solenoid 222 through their respective OR gate diodes indicated at 224. Also, the solenoid of another answering time counter *222a* may be connected in parallel with the solenoid 222 to provide a remote indication.

In order to provide an accurate answering time interval in each of the settings of the selector switch 40 without requiring close tolerance components in the timing capacitor circuit and expensive close tolerance unijunction transistors 190, the potentiometer 192 is employed. In a unijunction transistor such as the transistor 190, the firing level at which this transistor is rendered conductive is a function of the voltage between the two base electrodes thereof. Accordingly, adjustment of the potentiometer 192 is employed in accordance with the present invention to vary the firing level of the unijunction transistor 190 so that this firing level can be adjusted to take care of tolerances in the timing capacitor 180, the charging resistors 186 to 191, inclusive, and variations in the firing level encountered with different unijunction transistors 190. Thus, if the interbase resistance between the two bases of the transistor 190 varies from say 2,000 ohms to 8,000 ohms, the potentiometer 192 may have a value of 2,500 ohms and may be adjusted so that a particular unijunction transistor 190 fires at the correct point to give a desired time interval. Furthermore, the potentiometer 192 need be adjusted only at one setting of the switch 40 to provide accurate measurement of all of the timing intervals. Thus, the selector switch 40 may be set in the 5-second position, and a positive potential applied between the terminals 16 and 14, simulating the initiation of a call. The time taken to produce an output pulse at the terminal 214 is then measured, by any suitable timing means, and the potentiometer 192 is adjusted so that this time interval is exactly five seconds. The other time intervals for different positions of the selector switch 40 will then be accurately set to the indicated values even though inexpensive components are used in the timing circuit, as described above.

From the foregoing description it will be seen that an extremely simple and inexpensive electronic timer is provided for each trunk so that an accurate count of the number of total times a predetermined answering period is exceeded is displayed on the counter 54. Furthermore, each timer is provided with its own independently functioning time base so that it can function properly irrespective of the functioning of other timers in the group. Also, an extremely flexible arrangement is provided for accommodating a large number and variety of trunk groups while providing facilities for indicating both a peg count and an exceeded answering time count for all trunks of all groups.

Referring now to the FIGS. 3 to 6, inclusive, these figures show an answering time printout arrangement which may be employed with the answering time recorder system of FIGS. 1 and 2 automatically to provide a printed record of the number of times the operator exceeds a predetermined answering interval together with the number of trunk calls placed during successive printout intervals which are of shorter duration than the total interval as measured by the counters 27 and 54 of FIG. 1. In the illustrated embodiment the printout arrangement of FIGS. 3 to 6, inclusive, is arranged to provide separate printed records of the counts, both for exceeded answer time and trunk calls, derived from two different groups of trunks. In this embodiment, the outputs from the OR-gates 26 and 52 of FIG. 1 are printed in numerical form in two columns of the record strip and similar outputs from a separate but identical answering time recorder system servicing a different group of trunks are employed to provide a printed record in two other columns of the record strip for each of successive printout intervals.

Referring first to FIG. 3, the printout facilities are shown therein in basic block diagram form and in conjunction with only the inputs from one answering time recorder system, such as shown in FIG. 1. More particularly, the output of the OR-gate 52 of FIG. 1 is shown as applied to an input terminal 300 and the output of the OR-gate 26 in FIG. 1 is shown as applied to an input terminal 302. The pulses appearing at these terminals, which are also supplied to the six-digit counters 54 and 27, respective, are supplied to a print lockout circuit indicated generally at 304. Normally, the pulses appearing on the terminals 300 and 302 are transmitted through the print lockout circuit 304 to a printer 306 and are stored in different sets of print wheels of the printer 306, each set of print wheels being stepped one digit for each pulse applied to one of the terminals 300 or 302.

The print lockout circuit 304 is operated in conjunction with a printout interval main timer 308 which is arranged to provide an output signal at the end of a printout interval of variable duration. When the main timer 308 produced as output at the end of the preset printout interval, this signal is supplied through the print lockout circuit 304 and over the conductor 310 to an interval timer 312 which is also controlled by an output pulse from the main timer 308. The interval timer 312 establishes a 10-second time interval in response to the output pulse from the main timer 308. If during this 10-second interval a signal is supplied over the conductor 310 from the lockout circuit 304 then the interval timer 312 produces an output pulse on the conductor 314 which is supplied to a second interval timer 316. The second interval timer 316 develops a 200-millisecond output pulse on its output lead 318 which is supplied to the printer 306 and is of sufficient duration to cause the printer 306 to print the then existing conditions of all of the print wheels. The print wheels are then reset to zero so as to store the incoming pulses on the terminals 300 and 302 during the next printout interval. However, the counters 54 and 27 are not reset at the end of this printout interval but continue to register output pulses so that a total count over a number of successive printout intervals is given by the counters 54 and 27.

The lockout circuit 304 is arranged so that a signal is transmitted over the conductor 310 only during a period when no input pulses are applied to the input terminals 300 and 302. Accordingly, if during the 10-second interval established by the timer 312 no data is being supplied to the printer 306, a signal appears on the conductor 310 and the timer 312 develops an output which is operative through the timer 316 to cause a printing operation. As soon as the interval timer 312 produces an output pulse, it also supplies a signal over the conductor 320 back to the lockout circuit 304 so as to prevent the transmission of input pulses from the terminals 300 and 302 to the printer through the lockout circuit 304 during the remainder of the 10-second interval established by the timer 312. The main timer 308 is preferably of variable duration and establishes a printout interval of from 5 minutes to 60 minutes as indicated by a timer control knob and dial accessible from the front panel of the printout unit. Accordingly, the portion of the 10-second interval established by the timer 312 which may be lost if a signal is applied to the conductor 310 at the beginning of this interval is insignificant relative to the total count established over the printout interval. Furthermore, since the counters 27 and 54 are continuously operating over successive printout intervals, any discrepancies between the printed numbers obtained on the record strip of the printer 306 and the total count as shown by the counters 27 and 54 may be readily ascertained.

As shown in FIG. 6 and in accordance with a feature of the invention, the recorder 306 is arranged to service several different groups of trunks or lines which are each individually timed by means of the timers 38 in the system of FIG. 1. Thus, in FIG. 6 a first group of trunks or liens corresponding to a system such as shown in FIG. 1, is employed to provide a first column of four-digit numbers 330 on the record strip 320 corresponding to the number of times the predetermined answering time period has been exceeded in the Group No. 1 trunks and a second column of four-digit numbers 332 which provide in printed form the number of trunk calls in Group No. 1 during each printout interval. In a similar manner a third column of four-digit numbers 334 is provided which records in printed numerical form the exceed answer times for the trunks in Group No. 2 and a fourth column of four-digit numbers 336 is provided to record in printed numerical form the total number of trunk calls in Group No. 2 during the printout interval. On the same line with the exceed answer time and trunk call counts of both groups, a series of digits and indicia are provided to give the actual time at which the printout record is made at the end of each printout interval, as shown in FIG. 6.

Referring now to FIGS. 4A and 4B, the printer 406 is therein illustrated as comprising an arrangement which employs a number of print wheel modules each having an input lead and a transfer lead whereby successive modules may be interconnected to provide a decade printing wheel arrangement, as will be readily understood by those skilled in the art. The print wheel modules are customarily interconnected to provide a tens and units print wheel unit. Accordingly, if four digits are to be interconnected so as to provide a four-digit number, such as the numbers in the column 330 in FIG. 6, the transfer lead 340 from the output of the tens digit module is connected at the terminal board 342 of the printout unit to the terminal 344 of the next succeeding two-digit print wheel group so that as input pulses are applied to the input terminal 346 corresponding to each exceed answer time pulse supplied from the OR-gate 52 in the system of FIG. 1, the first four print wheel modules are interconnected so as to register a total of such pulses up to four digits. In a similar manner the next four print wheel modules are interconnected so as to store and register the number of output pulses supplied from the OR-gate 26 in the system of FIG. 1. The next two groups of four print wheel modules are similarly arranged to record similar counts from a different group of trunks or lines identified as Group No. 2.

In FIG. 4B, the print lockout circuit 304 is illustrated as receiving output pulses from both groups of trunks. More particularly, the output pulses from both groups of trunks. More particularly, the output pulses from the Group No. 1 ATR driver, i.e., the OR-gate 26 in the system of FIG. 1, are applied to an input terminal 350, the output pulses from the OR-gate 52 are supplied to the terminal 352, the output pulses from the Group No. 2 driver corresponding to the OR-gate 26 are applied to the input terminal 354 and the group No. 2 driver output pulses for exceed answer time are applied to the input terminal 356.

The output pulses applied to the terminals 350, 352, 354 and 356 are normally repeated through the print lockout circuit 304 to the respective groups of print wheel modules in the printer 306. Thus, the output pulses appearing on the terminal 350 are applied to one side of a relay coil 358, the output pulses applied to the terminal 352 are connected to one side of a relay coil 360, the output pulses appearing on the terminal 354 are supplied to one side of a relay coil 362 and the pulses applied to the terminal 356 are supplied to one side of a relay coil 364. The interval timer 312 normally supplies a ground over the conductor 366 to the common side of the relay coils 358, 360, 362 and 364. Accordingly, as output pulses are supplied to the respective terminals 350, 352, 354 and 356, the relay contacts of the corresponding relays are closed so as to repeat a ground signal to the respective print wheel modules in the printer 306. For example, when an output pulse is supplied to the terminal 350, the relay 358 is energized so that the contacts 358*a* thereof are closed. When this occurs central office ground is supplied through the closed contacts 358*a* and over the conductor 368 to the second group of print wheels in the printer 306 so that the print wheels corresponding to the second column of digits 332 (FIG. 6) store the number of pulses applied to the terminal 350 corresponding to the number of trunk calls in Group No. 1 during the printout interval. In a similar manner, output pulses supplied to the terminal 352 are repeated through the contacts 360*a* and over conductor 370 to the first group of print wheel modules to store the digits 330 (FIG. 6). Output pulses applied to the terminal 354 are repeated through the contacts 362*a* and over the conductor 372 to the fourth group of print wheel modules and output pulses supplied to the terminal 356 are repeated through the contacts 364*a* and over the conductor 374 to the third group of print wheel modules to provide the digits 334, and 336, respectively, shown in FIG. 6. The trunk call and exceed answer time counts are thus stored in each print wheel module group for the duration of each printout interval. At the end of a printout interval, the cam-operated contacts 380 (FIG. 4A), which are driven by the continuously energized timing motor 382, are closed so as to supply a ground signal (plus 48-volt signal) over the conductor 384 to the second set of contacts of each of the relays 358, 360 and 362 and 364 which are connected in series. If no data is being transferred to the print wheel modules in the printer 306 all of the relay contacts 358*b*, 360b, 362*b* and 364*b* are closed and the ground signal supplied over the conductor 384 is transmitted through these series connected closed relay contacts of the output conductor 386 of the print lockout circuit 304. This ground is then supplied by way of the conductor 386 to the interval timer 312. In the timers 312 and 316 the ground on the conductor 386 is employed to develop a print command pulse in a manner described in more detail hereinafter. However, if any data is being transmitted to any one of the four groups of print wheel modules in the printer 306, one of the series connected sets of relay contacts is open so that no output signal is developed on the conductor 386. For example, during any interval when an output pulse is supplied to the terminal 350, the contacts 358*b* of the relay 358 will be open so that the main timer ground signal appearing on the conductor 384 is not supplied to the conductor 386 and the interval timer 312 does not produce an output signal.

Considering now the detailed circuit arrangement of the interval timer 312 shown in FIG. 5, it will be recalled from the above general description of the printout system that a ground signal is supplied to the conductor 384 when the main timer 308 times out at the approximate end of a printout interval of predetermined length. This ground signal is supplied to the terminals 2B and 3B connected in parallel. Minus 48 volts is continuously supplied from the central office battery to the terminal 4B of the timer 312. When a ground signal is supplied to the conductor 384 by the main timer, this signal is supplied through a diode 400, a resistor 402 and a resistor 404 to the collector of a transistor 406 which forms one-half of a flip-flop circuit indicated generally at 408 the other half of which is formed by a transistor 410.

The ground signal applied to the conductor 384 is also supplied through a diode 412 and the resistors 414 and 416 to the collector of the transistor 410. However, a capacitor 418 is connected from the right-hand side of the resistor 414 to minus 48 volts so that the voltage at the collector of the transistor 410 does not build up as quickly as the voltage at the collector of the transistor 406. As a result, the flip-flop 408 is always set to the condition in which the transistor 406 is not conducting and the transistor 410 is conducting when a ground signal is applied to the conductor 384.

The timer 312 is employed to establish a sensing interval of perhaps 10 seconds duration immediately following the application of a ground signal to the conductor 384 when the main timer times out. During this 10 second interval printing can occur but only if no data is being transmitted through the print lockout circuit 304 for a brief period of approximately 1 millisecond at some time during the 10-second sensing interval established by the timer 312. Accordingly, the timer 312 does not produce an output signal unless and until no data pulses are being transmitted through the print lockout circuit 304. However, since the output pulses supplied to the counters 52 and 26, and the terminals 350, 352, etc., are of approximately 15 to 20 milliseconds duration, there is very little likelihood that the entire 10-second sensing interval will be taken up by data transmission. Furthermore, even if this occurs, the main timer 308 is reset mechanically at the end of its preset timing interval so that a printout would occur at the end of the next main timing interval and the total time between printouts would be indicated in the time column of the record strip 320.

In order to establish a 10-second interval, a timing circuit is provided in the timer 312 which comprises a potentiometer 420, a series resistor 422 and a large capacitor 424 which are connected across a voltage-regulating zener diode 426 which supplies a constant voltage for this timing circuit. The junction of the resistor 422 and the capacitor 424 is connected to the emitter of a unijunction transistor 428. Accordingly, 10 seconds after ground is applied to the conductor 384, the unijunction transistor 428 is rendered conductive so as to produce an output pulse across the resistor 430 connected to one base of the transistor 428. This voltage produced across the resistor 430 is coupled through a resistor 432 to the base of the transistor 406 and operates to flip the flip-flop 408 to the opposite conductive state in which the transistor 406 is conducting and the transistor 410 is turned off.

During the 10-second interval established by the timer 312, this timer is arranged to produce an output pulse at any time when no data pulses are being transmitted to the print wheel modules. Thus, during this 10-second interval the transistor 406 is nonconductive so that the collector potential thereof is relatively positive. A control transistor 434 is provided with a resistor 436 in the emitter circuit thereof and the base of the transistor 434 is connected to the collector of the transistor 406 so that the transistor 434 is conducting during the 10-second interval established by the timer 312. The voltage across the resistor 436 is supplied through a resistor 438 to the base of an output transistor 440 the collector of which is connected to one side of a relay coil 442 the other side of which is connected to the conductor 386 extending from the print lockout circuit 304. Accordingly, during the 10-second interval following application of a ground to the conductor 384, the transistor 480 is prepared to conduct and energize the relay coil 442 at any time when a ground signal is applied to the conductor 386. Accordingly, if no input pulses are being applied to any of the input terminals 350, 352, 354 and 356 in the lockout circuit 304 at any time during the 10-second sensing interval, all of the series connected relay contacts described heretofore are closed so that a ground from the central office is supplied over the conductor 386 to the collector circuit of the relay 440 so that the relay 442 is energized. When the relay 442 is energized, the contacts 442*a* thereof are opened and the contacts 442*b* thereof are closed. Opening of the contacts 442*a* removes a ground, normally supplied from the associated answer time recorder system, from the conductor 366 so that all of the relays 358, 360, 362 and 364 in the print lockout circuits 304 are thereafter disabled and the transmission of data pulses to the print wheel modules of the printer is positively prevented for the remainder of the 10-second interval established by the timer 312. This lockout operation is performed so that no input pulses will be supplied to the print wheel modules while the printing operation is being effected.

At the end of the 10-second interval, the unijunction transistor 428 fires, a voltage is produced across the resistor 430 and the transistor 406 is rendered conductive so that the collector of this transistor goes negative and turns off the control transistor 434. When the control transistor 434 is rendered nonconductive the transistor 440 is turned off and the relay 442 is deenergized. When this occurs ground is returned to the lead 366 and data transmission through the circuit 304 is resumed. Also, since the base circuit of the output transistor 440 is at a negative potential the transistor 440 will not conduct even though a ground signal from the main timer 308 continues to be applied to the conductor 386. The sensing interval established by the timer 312 thus accurately determines the end of the printout interval even though the main timer 308 may have a mechanical reset time of considerably longer and variable duration.

Considering now the situation where the transistor 440 is rendered conductive during the 10 second interval established by the timer 312, when this occurs the contacts 442*b* are closed so that central office ground is supplied by way of the conductor 444 to the interval timer 316. The interval timer 316 is identical to the interval timer 312 except that the terminals 11B and 10B thereof are disconnected and the terminals 11B and 9B are connected so that a capacitor 446, of substantially smaller value than the capacitor 424, is employed as the timing capacitor in the timing circuit of the interval timer 316. Also, in the timer 316 the terminals 1B, 2B and 3B are all connected together and are supplied with a ground signal from the timer 312 over the conductor 444. Accordingly, the interval timer 316 supplies ground to its output conductor 8B as soon as a ground signal is supplied to the conductor 444 and the timing circuit in the timer 316, which includes the capacitor 446, is arranged to cause the output transistor 440 of the timer 316 to be energized for only a period of approximately 200 milliseconds, i.e., the time necessary to effect a printing operation in the printer 306. The ground thus produced on the output conductor 448 of the interval timer 316 is thus employed as a print command signal which is supplied through the terminal board 343 and the conductor 450 to the relay coil of a print command relay 452 the other side of which is connected to minus 48 volts. Energization of the relay 452 is effective to supply a ground signal over the conductor 454 is effective to supply a ground signal over the conductor 454 to the print solenoid in the printer 306 so that the then-exisitng positions of all of the print wheels in the printer 306 are imprinted on the record strip 320 through a suitable inked ribbon to provide a permanent record in numerical form of the exceeded answer time counts and the trunk call count in each of the two groups of trunks being monitored together with the time at which the printout is made at the end of the printout interval. Energization of the relay 452 is also effective to remove minus 48 volts from the conductor 456 extending to the printer control circuits 458 so that a reset timing circuit is started. This reset timing circuit produces a sufficient time delay to complete the printing operation and a signal is then supplied over the conductor 458 to the operating coil of a reset relay 460 the other side of which is connected to minus 48 volts. When the relay 460 is thus energized, the contacts 462 thereof are closed so that a further relay 464 is energized. When the relay 464 is energized, reset pulses are supplied through the contacts 466 of the relay 464 and over the conductor 468 to the printer 306. These reset pulses are developed by a suitable multivibrator circuit in the printer control circuits 458 and are applied in parallel to the reset terminals of each of the print wheel modules in the printer 306 through suitable driver circuits. These reset pulses occur at a relatively rapid rate so that each print wheel is rapidly stepped to the zero position at which time the reset lead is opened so that the print wheel remains at zero. Accordingly, within a short interval of a few hundred milliseconds, all of the print wheels have been returned to zero. The timing circuit in the printer control circuits 458 then removes the enabling potential from the conductor 458 so that the relay 460 drops out and the reset relay 464 is is in turn deenergized.

Considering now the manner in which the print wheels corresponding to the time indication shown in FIG. 6 are actuated, a clock 470 is continuously energized from the 110-volt supply and periodically closes the contacts 472 so that pulses are supplied through the pulse-forming resistor 474 and capacitor 476 to the units print wheel of the time print wheel set of modules. In order that the time print wheels may be set to coincide with the time at which printing on the record strip 320 is initiated, a minutes advance pushbutton 478 and an hours advance pushbutton 480 are provided which may be depressed to supply internally generated pulses to the minutes and hours print wheels to advance them to the desired time indication. A print advance pushbutton 482 is also provided which when depressed produces a signal corresponding to a print command signal on the conductor 448 so that a time indication can be printed on the record strip 320 to check the setting of the minutes and hours print wheels. When the pushbutton 482 is depressed it supplies plus 48 volts to the relay coil 452 in the same manner as a print command signal on the conductor 448.

Considering now the E and M lead adapter arrangement shown in FIGS. 7 and 8, this arrangement is employed to provide tributaries with answering time recording capabilities so that the tributaries can measure the quality of service rendered by toll center operators. The E and M lead adapter arrangement shown in FIG. 7 is arranged to function with an answering time recording system such as shown in FIG. 1, wherein a negative input signal is supplied to the input conductor 18. The adapter arrangement of FIG. 7 comprises a series of 25 logic circuits 500 each of which is adapted to function with the E lead 502 and M lead 504 in a tributary office, each of the circuits 500 providing a negative output signal on the conductor 506 which is supplied to the conductor 18 of the answering time recorder circuit of FIG. 1, it being understood that printout facilities such as described in detail heretofore in connection with FIGS. 3 to 6, inclusive, may be associated with this answering time recorder to provide automatic printout of the E and M lead service on each of these 25 trunks.

In FIG. 8 one of the logic circuits 500 is shown in detail. Referring to this figure, a dual coil relay indicated generally at 510 is provided with a pair of separate relay coils 512 and 514 of the polarity indicated, each of these coils being protected by the respective diodes 516 and 518. The contacts 510*a* and 510*b* of the dual coil relay 510 are normally open.

When the subscriber initiates a call over one of the incoming trunks a negative signal is supplied to the M lead terminal 520 and is applied to a voltage divider comprising the resistors 522 and 524 connected from the M lead terminal 520 to ground. Accordingly, as soon as the subscriber initiates a call on a particular trunk, a negative signal is applied to the output terminal 526 through the voltage divider 522, 524 of sufficient magnitude to actuate the answering time recorder facilities in the system of FIG. 1. When the operator answers the subscriber a ground signal is produced on the E lead input terminal 528 which energizes the relay coil 514 of the relay 510 so that the contacts 510*a* and 510*b* thereof are closed. When the contacts 510*a* are closed ground is applied to the ATR terminal 526 so that the negative signal to the answering time measuring facilities in the system of FIG. 1 is terminated.

When the contacts 510*b* are closed, a holding circuit is established for the relay coil 512 from ground through the contacts 510*b* back to the M lead terminal 520 to which a negative voltage is applied. Accordingly, when the operator pulls out her plug and ground disappears from the E lead terminal 528, the relay 510 does not release and produce a false trunk seizure count. The relay 510 remains energized until the subscriber hangs up and the negative signal disappears from the terminal 520. On the other hand, if the subscriber hangs up first, and while the operator is still connected to the terminal 528, the relay 510 still remains energized so that a false trunk call is not registered, and the relay 510 is not deenergized until the operator also is disconnected from the terminal 528. In the arrangement of FIGS. 7 and 8 the series of logic circuits 500 are preferably contained in a compact adapter unit provided with clip ended input cables for quick connection to one-way out-going manual, two-way dial to manual, "0" level and C.A.M.A.–O.N.I. trunks. This adapter unit may be either permanently rack mounted or provided as a portable unit for shared use between more than one central office of PBX.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a telephone system, a plurality of trunks adapted to receive incoming calls, timing means individually associated with each of said trunks, said timing means comprising a capacitor, a silicon-controlled rectifier connected across said capacitor, means for rendering said rectifier conductive at a high frequency of occurrence when the associated trunk is idle, means responsive to an incoming call for holding said rectifier nonconductive, thereby to permit said capacitor to charge to a higher level than when the associated trunk is idle, means for resetting each timing means in the event the call on the associated trunk is idle, means for resetting each timing means in the event the call on the associated trunk is answered within a predetermined time interval, means for developing an output pulse when said capacitor is charged to a predetermined level, means utilizing said output pulse to reset said timing means, and means for indicating the total number of output pulses collectively developed by the timing means associated with said plurality of trunks.

2. The arrangement set forth in claim 1, wherein there is provided a unijunction transistor having the emitter thereof connected to the one terminal of said capacitor and one base thereof connected to the other terminal of said capacitor, and means for biasing the other base of said unijunction transistor so that said transistor conducts when said capacitor is charged to said predetermined level.

3. The arrangement as set forth in claim 1, wherein there is provided a flip-flop circuit, means responsive to an incoming call on the associated trunk for setting said flip-flop circuit to one conductive state, means responsive to the setting of said flip-flop for holding said rectifier nonconductive, and means responsive to said output pulse for resetting said flip-flop to its original conductive state, thereby to render said rectifier conductive and prevent the development of another output pulse in response to the continuation of said incoming call.

4. The arrangement as set forth in claim 3, wherein there is provided a time delay network connected between said flip-flop circuit and said rectifier and arranged to delay the time at which said rectifier is rendered conductive after discharge of said capacitor is initiated.

5. In a telephone system, a plurality of trunks adapted to receive incoming calls, timing means for developing output pulses in the event calls on any of said trunks are not answered within a predetermined answering time interval, means for storing said output pulses for a predetermined printout interval, and means operative at the end of said printout interval of producing a permanent record in numerical form of the number of said output pulses occurring in said printout interval and resetting said storage means for storage of said output pulses during the next printout interval.

6. The arrangement as set forth in claim 5, wherein said recording means includes means for concurrently producing a permanent record in numerical form of the time at which said recorded printout interval is terminated.

7. The arrangement as set forth in claim 5, wherein there is provided means for varying the length of said printout interval.

8. The arrangements set forth in claim 5, wherein said plurality of lines are arranged in different groups and said recording means is arranged to print out separately the total number of said output pulses produced in each of said line groups at the end of said printout interval.

9. The arrangement as set forth in claim 5, wherein said plurality of lines are arranged in different groups, said storage means is arranged to store separately the number of output pulses produced in each line group during said printout interval, and said recording means is arranged to make a separate record in numerical form of the total number of output pulse produced in each of said line groups at the end of said printout interval.

10. The arrangement as set forth in claim 5, wherein there is provided means for automatically resetting said storage means to zero and reinitiating another printout interval each time said permanent record is made, whereby a continuous record is made of the number of output pulses occurring in connection with calls initiated on said lines during successive printout intervals.

11. In a telephone system, a plurality of trunks adapted to receive incoming calls, timing means for developing output pulses in the event calls on any one of said trunks are not answered within a predetermined answering time interval, means for storing said output pulses for a predetermined printout interval, said storage means comprising a series of print wheels which are moved one digit for each output pulse transmitted thereto, means operative at the end of said printout interval for producing a permanent record in numerical form of the number of said output pulses occurring in said printout interval, and means for terminating a printout interval only at a time when no output pulses are being transmitted to said print wheels.

12. In a telephone system, a plurality of trunks arranged in different groups and adapted to receive incoming calls, timing means for developing output pulses in the event calls on any of said trunks are not answered within a predetermined answering time interval, means for separately storing the number of output pulses produced in each trunk group during a predetermined printout interval, said separate storing means each comprising a series of print wheels to which the corresponding output pulses are transmitted, means operative at the end of said printout interval for printing the position of each set of print wheels, and means for preventing the transmission of output pulses to said print wheels during printing of said print wheel positions.

13. In a telephone system, a plurality of trunks adapted to receiving incoming calls, a first set of interconnected digit wheels for storing and indicating in digital form the total number of calls initiated on said plurality of trunks, means for actuating said first set of wheels one least significant digit step in response to an incoming call on any one of said plurality of trunks, timing means individually associated with each of said trunks, means individual to said trunks for starting the associated timing means in response to a call incoming thereto, means for resetting said timing means in the event said call is answered within a predetermined time interval, means for developing an output pulse in the event said call is not answered within said predetermined time interval, a second set of interconnected digit wheels for storing and indicating in digital form the total number of output pulses developed by the timing means associated with said plurality of trunks, and means for actuating said second set of wheels one least significant digit step in response to each of said output pulses.

14. In a telephone system, a plurality of trunks adapted to receive incoming calls, timing means individually associated with each of said trunks, means individual to each of said trunks for starting the associated timing means in response to a call incoming thereto, means for resetting said timing means in the event said call is answered within a predetermined time interval, means for developing an output pulse in the event said call is not answered within said predetermined time interval, means utilizing said output pulse to reset said timing means, means for indicating the total number of output pulses developed by the timing means associated with said plurality of trunks, and means for simultaneously varying said predetermined time interval for all of said timing means associated with said plurality of trunks.

15. In a telephone system, a plurality of trunks adapted to receive incoming calls, timing means individually associated with each of said trunks, means individual to each of said trunks for starting the associated timing means in response to a call incoming thereto, means for resetting said timing means in the event said call is answered within a predetermined time interval, means for developing an output pulse in the event said call is not answered within said predetermined time interval, means utilizing said output pulse to reset said timing means, means for indicating the total number of output pulses developed by the timing means associated with said plurality of trunks, and means for preventing false registration of calls by said indicating means in response to termination of a call on any one of said trunks.

16. In a telephone system, a plurality of trunks adapted to receive incoming calls, a timing arrangement including timing means individually associated with each of said trunks, means for starting the timing means associated with a particular trunk in response to a call incoming thereto, means for resetting said timing means in the event said call is answered within a predetermined time interval, means for developing an output pulse in the event said call is not answered within said predetermined time interval, means for indicating the total number of output pulses developed by the timing means associated with said plurality of trunks, and means for simultaneously varying said predetermined time interval for all of said timing means associated with said plurality of trunks.

17. In a telephone system, a plurality of trunks adapted to receive incoming calls, a timing arrangement including timing means individually associated with each of said trunks, means for starting the timing means associated with a particular trunk in response to a call incoming thereto, means for resetting said timing means in the event said call is answered within a predetermined time interval, means for developing an output pulse in the event said call is not answered within said predetermined time interval, means for indicating the total number of output pulses developed by the timing means associated with said plurality of trunks, an answer time selector switch common to said plurality of trunks, and means controlled by said selector switch for varying said predetermined time interval for all of said timing means associated with said plurality of trunks.

18. In a telephone system, a plurality of trunks adapted to receive incoming calls, timing means individually associated with each of said trunks, and including a capacitor, and means for continuously charging and discharging said capacitor within predetermined upper and lower voltage limits, thereby to maintain a predetermined minimum charge on said capacitor during periods when the associated trunk is idle, means individual to each of said trunks for starting the associated timing means in response to a call incoming thereto, means for resetting said timing means in the event said call is answered within a time interval, means for developing an output pulse in the event said call is not answered within said predetermined time interval, means utilizing said output pulse to reset said timing means, and means for indicating the total number of output pulses developed by the timing means associated with said plurality of trunks.

* * * * *